US012495708B2

(12) United States Patent
Abe

(10) Patent No.: US 12,495,708 B2
(45) Date of Patent: Dec. 9, 2025

(54) DISPLAY DEVICE

(71) Applicant: SHARP KABUSHIKI KAISHA, Sakai (JP)

(72) Inventor: Kaoru Abe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 379 days.

(21) Appl. No.: 18/265,143

(22) PCT Filed: Dec. 3, 2020

(86) PCT No.: PCT/JP2020/045011
§ 371 (c)(1),
(2) Date: Jun. 2, 2023

(87) PCT Pub. No.: WO2022/118423
PCT Pub. Date: Jun. 9, 2022

(65) Prior Publication Data
US 2024/0008347 A1    Jan. 4, 2024

(51) Int. Cl.
*H10K 77/10*         (2023.01)
*G06F 1/16*          (2006.01)
*H10K 59/80*         (2023.01)

(52) U.S. Cl.
CPC ......... *H10K 59/877* (2023.02); *G06F 1/1641* (2013.01); *G06F 1/1652* (2013.01); *H10K 77/111* (2023.02)

(58) Field of Classification Search
CPC ............................ H10K 77/111; H10K 59/877
See application file for complete search history.

(56) References Cited

U.S. PATENT DOCUMENTS

| 2004/0051451 | A1  | 3/2004  | Kawase et al. |
| 2012/0293744 | A1  | 11/2012 | Watanabe |
| 2017/0090230 | A1* | 3/2017  | Yoon ................. G02F 1/133308 |

FOREIGN PATENT DOCUMENTS

| JP | 2004-111059 A   | 4/2004 |
| WO | 2011/093388 A1  | 8/2011 |
| WO | 2013/027508 A1  | 2/2013 |
| WO | 2020/115963 A1  | 6/2020 |

* cited by examiner

*Primary Examiner* — Douglas M Menz
(74) *Attorney, Agent, or Firm* — ScienBiziP, P.C.

(57) ABSTRACT

A display device includes a first display panel including a first end portion that is bent, and a second display panel including a second end portion that is bent, wherein the first display panel and the second display panel are arranged in a plane such that the first end portion and the second end portion are adjacent to each other, each of subpixels is provided at respective one of the first end portion and the second end portion, and a connecting portion having a light diffusion function is formed between the first end portion and the second end portion.

12 Claims, 6 Drawing Sheets

(a)

(b)

DISPLAY DEVICE

TECHNICAL FIELD

The disclosure relates to a display device.

BACKGROUND ART

PTL 1 discloses a method of improving uniformity of in-plane light emission by providing a light extraction member so as to overlap a joint (transparent adhesive layer) between two light-emitting panels disposed in a plane.

CITATION LIST

Patent Literature

PTL 1: WO 2013/027508

SUMMARY

Technical Problem

In a display device configured by connecting a plurality of display panels arranged in a plane, there is a problem in that display quality deteriorates due to formation of connecting portions (joints).

Solution to Problem

A display device according to an aspect of the disclosure includes a first display panel including a first end portion that is bent and a second display panel including a second end portion that is bent, wherein the first display panel and the second display panel are arranged in a plane such that the first end portion and the second end portion are adjacent to each other, a subpixel is provided at each of the first end portion and the second end portion, and a connecting portion (joint) having a light diffusion function is formed between the first end portion and the second end portion.

Advantageous Effects of Disclosure

Display quality of a display device configured by connecting a plurality of display panels can be improved.

DESCRIPTION OF EMBODIMENTS

FIG. 1(a) is a plan view illustrating a configuration of a display device, and FIG. 1(b) is a cross-sectional view illustrating the configuration of the display device. FIG. 2(a) is a cross-sectional view illustrating a configuration near a connecting portion, and FIG. 2(b) is a cross-sectional view illustrating a configuration of a subpixel.

Figure 1:
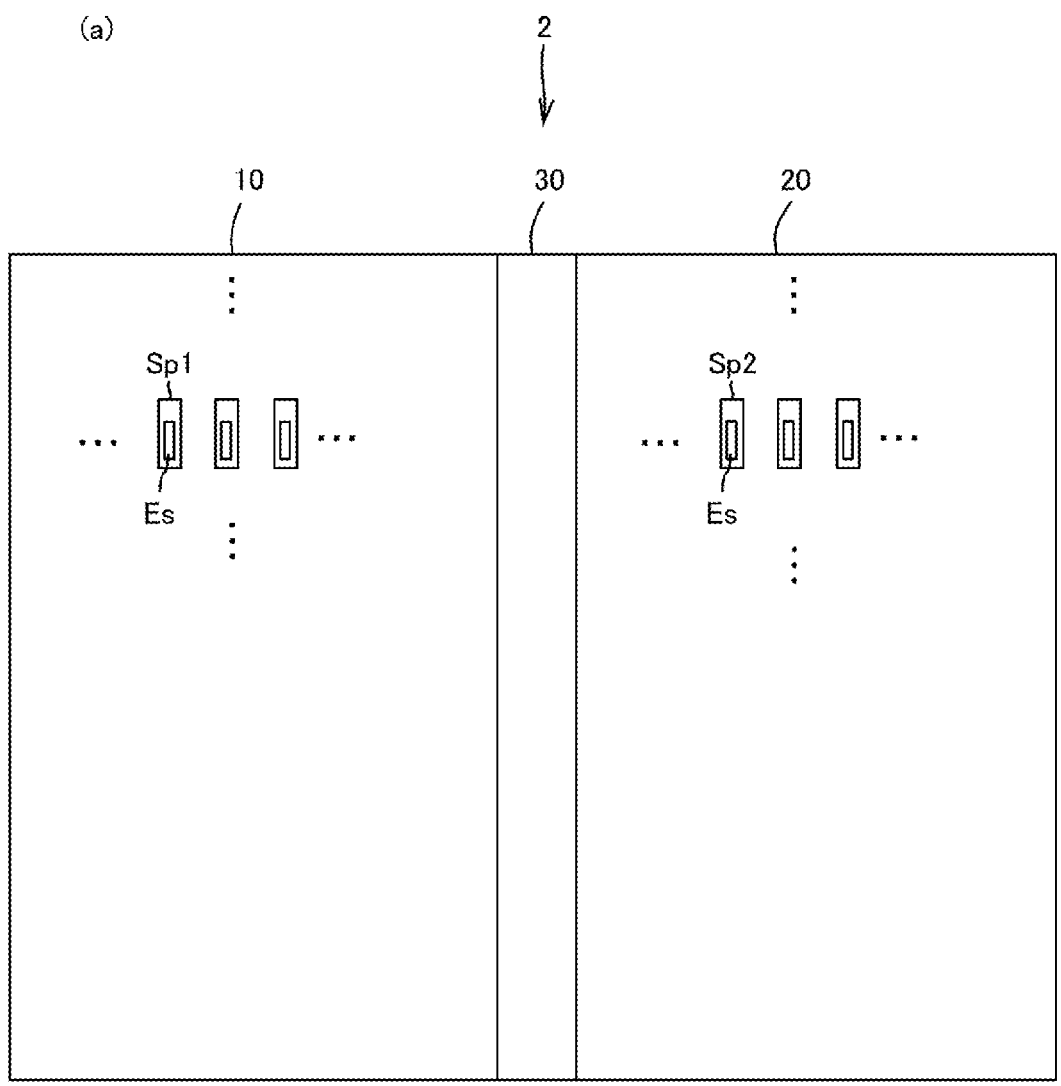
FIG. 1(a) is a plan view illustrating a configuration of a display device.
FIG. 1(b) is a cross-sectional view illustrating the configuration of the display device.
Figure 1:
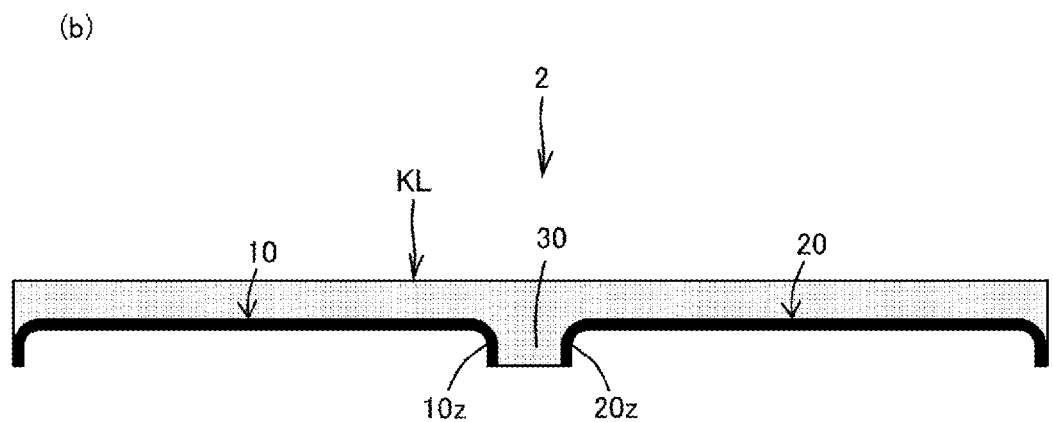
Figure 2:
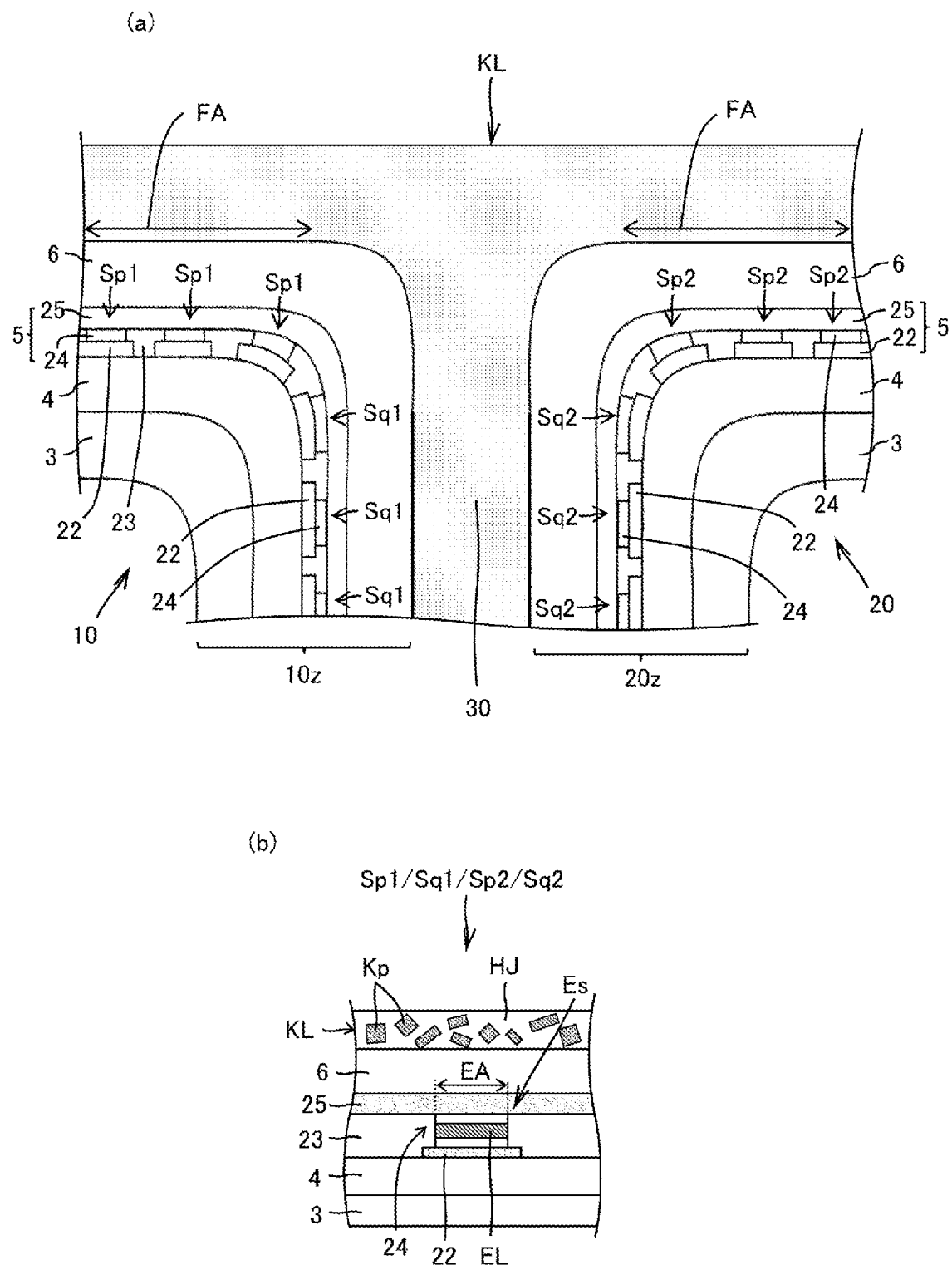
FIG. 2(a) is a cross-sectional view illustrating a configuration near a connecting portion.
FIG. 2(b) is a cross-sectional view illustrating a configuration of a subpixel.

As illustrated in FIGS. 1 and 2, a display device 2 includes a first display panel 10 including a first end portion 10z that is bent and a second display panel 20 including a second end portion 20z that is bent, wherein the first display panel 10 and the second display panel 20 are arranged in a plane such that the first end portion 10z and the second end portion 20z are adjacent to each other, and a connecting portion 30 (joint between the first display panel 10 and the second display panel 20) having a light diffusion function is formed between the first end portion 10z and the second end portion 20z.

A light diffusion layer KL having an adhesive function is provided to the display device 2 so as to cover the first display panel 10 and the second display panel 20, and the connecting portion 30 includes a part of the light diffusion layer KL. As illustrated in FIG. 2(b), the light diffusion layer KL is configured by dispersing a large number of light diffusion particles Kp in a thermosetting resin HJ.

Each of the first display panel 10 and the second display panel 20 includes a substrate 3 having flexibility, a TFT layer (thin film transistor layer) 4, a light-emitting element layer 5, and a sealing layer 6.

In the light-emitting element layer 5, a first electrode 22, an edge cover film 23 that covers edges of the first electrode 22, an active layer 24 including a light-emitting layer EL, and a second electrode 25 (common electrode) are formed, and a light-emitting element Es is configured by the first electrode 22, the second electrode 25, and the active layer 24.

In the first display panel 10, a plurality of subpixels Sp1 are provided at a non-end portion (flat portion) FA, and a plurality of subpixels Sq1 are provided at the first end portion 10z that is bent. In the second display panel 20, a plurality of subpixels Sp2 are provided at the non-end portion (flat portion) FA, and a plurality of subpixels Sq2 are provided at the second end portion 20z that is bent. Each of the subpixels Sp1, Sq1, Sp2, and Sq2 includes the light-emitting element Es formed in the light-emitting element layer 5 and a pixel circuit (not illustrated) formed in the TFT layer 4.

The substrate 3 is a glass substrate or a flexible base material including resin such as polyimide as a main component, and for example, the substrate 3 may be constituted by two layers of polyimide films and an inorganic film interposed therebetween. Although not illustrated, a base coat film (for example, an inorganic insulating film such as silicon nitride) that prevents entry of foreign matters such as water and oxygen is formed between the substrate 3 and the TFT layer 4.

A pixel circuit (not illustrated) connected to the light-emitting element Es is formed in the TFT layer 4. The pixel circuit includes a plurality of transistors including a drive transistor and a capacitance element, and is connected to a plurality of signal lines such as a scanning signal line, a data signal line, and a light emission control signal line, and a power source line.

In the light-emitting element layer 5, one of the first electrode 22 and the second electrode 25 functions as an anode, and the other functions as a cathode. The first electrode 22 is a light reflective electrode formed by layering indium tin oxide (ITO) and silver (Ag) or an alloy containing Ag, for example. The second electrode 25 is formed of a metal thin film of, for example, a magnesium silver alloy and has light transmittance. The edge cover film 23 is formed of, for example, an organic insulating material such as polyimide. An overlapping region between a non-edge portion (an exposed portion which is not covered with the edge cover film 23) of the first electrode 22 and the light-emitting layer EL is a light-emitting region EA.

The active layer 24 is formed by vapor deposition, an ink-jet method, an application method, a photolithography method, or the like. As the light-emitting layer EL of the active layer 24, an organic light-emitting layer having an island shape, a quantum dot light-emitting layer having an island shape, or the like can be used. The active layer 24 may include, in addition to the light-emitting layer EL, at least one of a positive hole injection layer, a positive hole transport layer, an electron blocking layer, a positive hole blocking layer, an electron transport layer, and an electron injection layer.

In a case where the light-emitting layer EL of the active layer 24 is the organic light-emitting layer, and the light-emitting element Es constitutes an organic light-emitting diode (OLED), positive holes and electrons recombine inside the light-emitting layer in response to a drive current between the first electrode 22 and the second electrode 25, and light is emitted when the excitons generated in this manner transition to a ground state.

In a case where the light-emitting layer EL of the active layer 24 is the quantum dot light-emitting layer, and the light-emitting element Es constitutes a quantum dot light-emitting diode (QLED), positive holes and electrons recombine inside the light-emitting layer in response to a drive current between the first electrode 22 and the second electrode 25, and light is emitted when the excitons generated in this manner transition from the conduction band of the quantum dot to the valence band.

The sealing layer 6 covering the light-emitting element layer 5 is a layer that prevents penetration of foreign matter such as water or oxygen into the light-emitting element layer 5, and for example, the sealing layer 6 can include two inorganic sealing films and an organic film formed therebetween.

Figure 3:
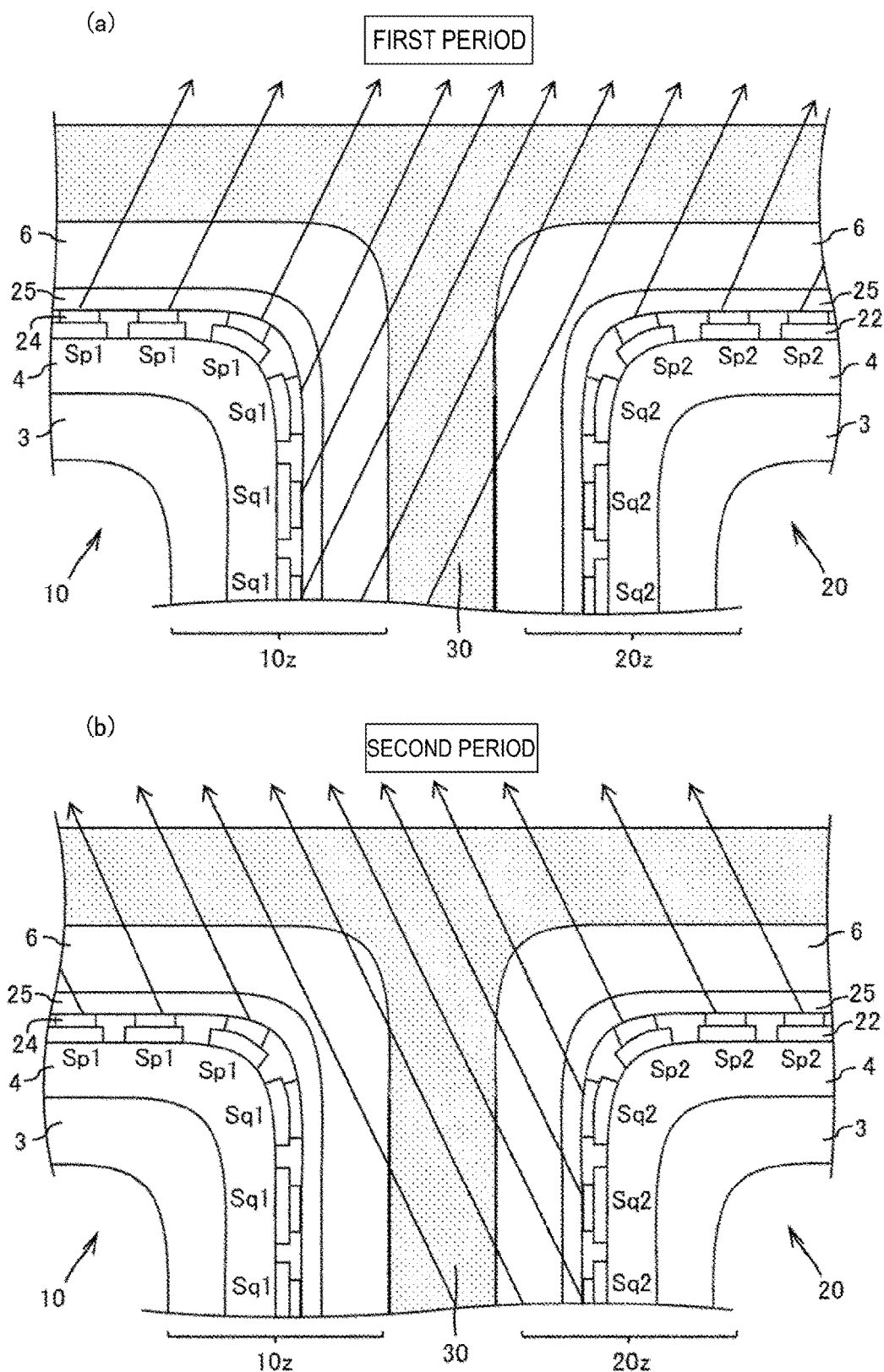
FIG. 3 is a schematic view illustrating an image display method in the display device.

FIG. 3 is a schematic view illustrating an image display method in the display device. The display device 2 is provided with a first period in which an image is displayed on the subpixels Sp1 and Sq1 of the first display panel 10 (including the first end portion 10z) and the subpixels Sp2 at the non-end portion of the second display panel 20, and an image is not displayed on the subpixels Sq2 at the second end portion 20z (the light-emitting elements Es of the subpixels Sq2 do not emit light) as illustrated in FIG. 3(a), and a second period in which an image is displayed on the subpixels Sp2 and Sq2 of the second display panel 20 (including the second end portion 20z) and the subpixels Sp1 at the non-end portion of the first display panel 10, and an image is not displayed on the subpixels Sq1 at the first end portion 10z (the light-emitting elements Es of the subpixels Sq1 do not emit light) as illustrated in FIG. 3(b). The first period and the second period may be constant periods, and desirably, the first period and the second period are alternately arranged. For example, the first period can be an odd-numbered frame period and the second period may be an even-numbered frame period.

Figure 4:
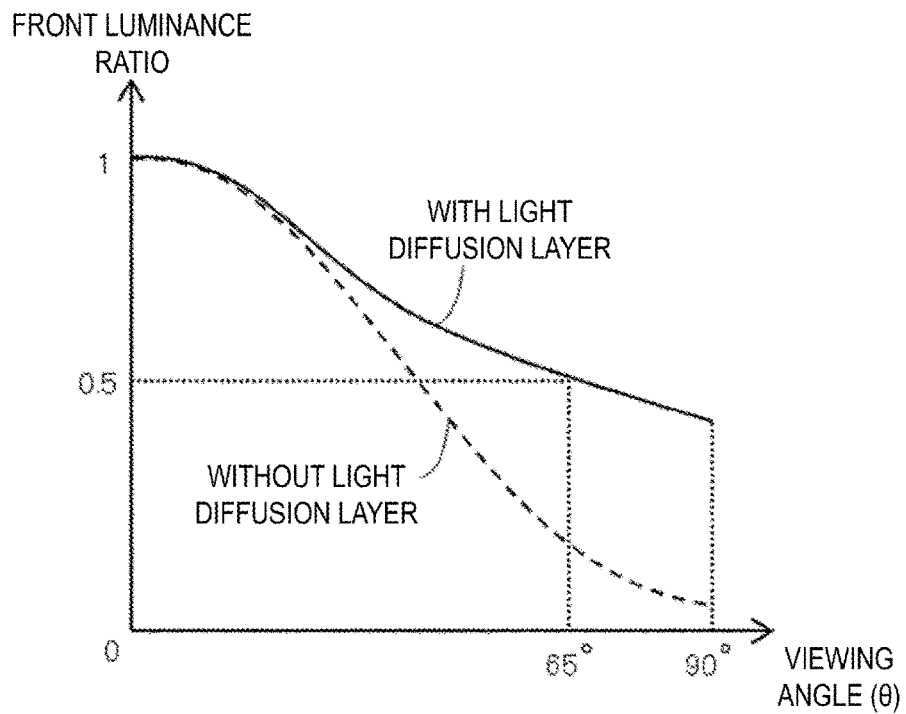
FIG. 4 is a graph showing a relationship between a viewing angle of the subpixel and a front luminance ratio.
Figure 5:
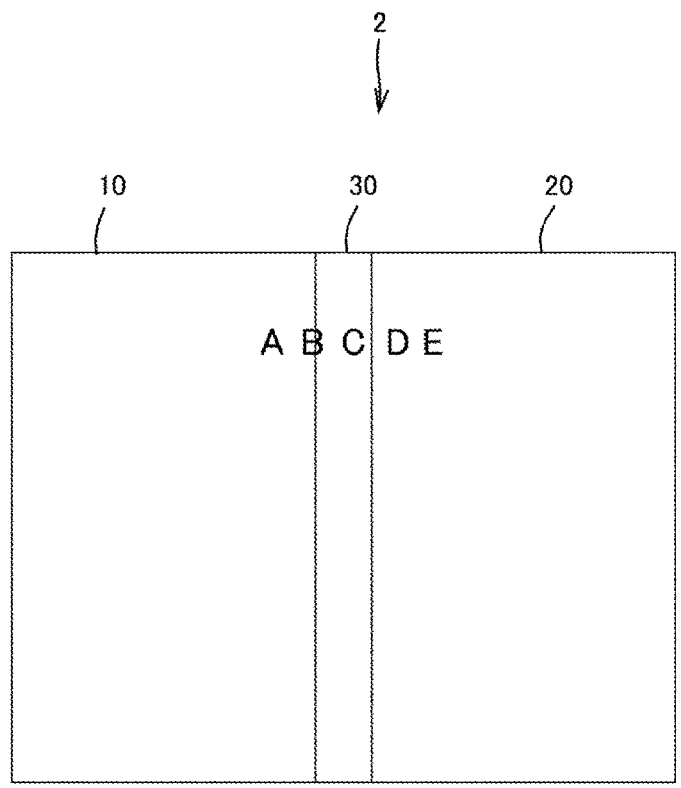
FIG. 5 is a plan view illustrating a display state of the display device.

FIG. 4 is a graph showing a relationship between a viewing angle of the subpixel (an angle formed by a perpendicular direction of the subpixel and a viewing direction of the subpixel) and a front luminance ratio (a ratio of luminance at a viewing angle $\theta$ to luminance at a viewing angle 0). FIG. 5 is a plan view illustrating a display state of the display device. As illustrated in FIG. 4, it is understood that the front luminance ratio in a case where the viewing angle is large (30° or more) is significantly improved by providing the light diffusion layer KL on the subpixel.

Figure 8:
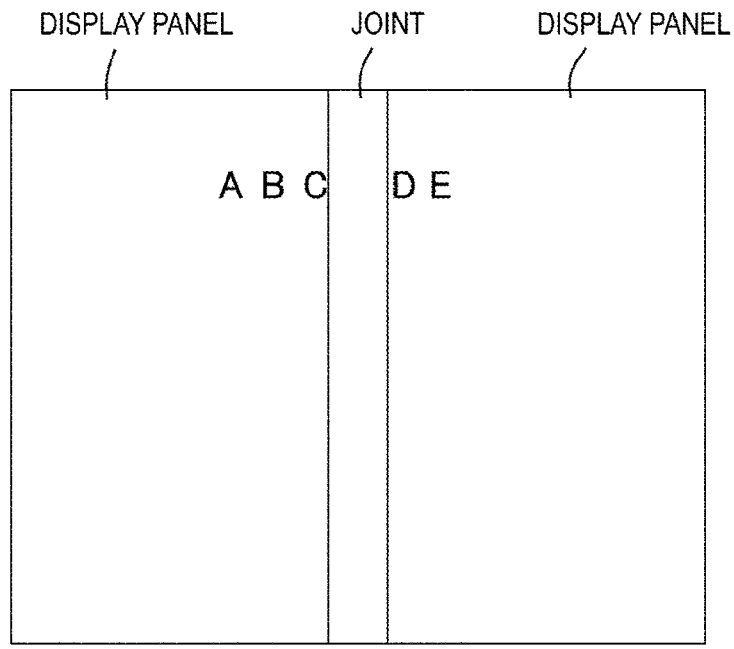
FIG. 8 is a plan view illustrating a display state of a known display device.

As described above, by displaying an image on the subpixels Sq1 at the first end portion 10z or on the subpixels Sq2 at the second end portion 20z and providing the connecting portion 30 between the first end portion 10z and the second end portion 20z with a light diffusion function, as illustrated in FIG. 5, an image (a part of B, and C) appears to be displayed on the connecting portion 30 when viewed obliquely. Thus, the display quality of the display device 2 configured by connecting the first display panel 10 and the second display panel 20 can be improved more than the display quality of the known display illustrated in FIG. 8 (in which the joint is conspicuous).

As illustrated in FIG. 4, the front luminance ratio of the subpixel decreases as the viewing angle increases. In the display device 2, since the viewing angle of the subpixel Sq1 is larger than the viewing angle of the subpixel Sp1, even when the same gray scale is input to the subpixel Sp1 and the subpixel Sq1 in the first period, the luminance of the subpixel Sq1 is made higher than the luminance of the subpixel Sp1. Since the image is not displayed on the subpixel Sq1 during the second period, the total lighting time of the subpixel Sq1 is shorter than the total lighting time of the subpixel Sp1. Thus, even when the luminance of the subpixel Sq1 is made higher than the luminance of the subpixel Sp1, the deterioration variation between the subpixel Sp1 and the subpixel Sq1 is suppressed.

Similarly, since the viewing angle of the subpixel Sq2 is larger than the viewing angle of the subpixel Sp2, even when the same gray scale is input to the subpixel Sp2 and the subpixel Sq2 in the second period, the luminance of the subpixel Sq2 is made higher than the luminance of the subpixel Sp2. Since the image is not displayed on the subpixel Sq2 during the first period, the total lighting time of the subpixel Sq2 is shorter than the total lighting time of the subpixel Sp2. Thus, even when the luminance of the subpixel Sq2 is made higher than the luminance of the subpixel Sp2, the deterioration variation between the subpixel Sp2 and the subpixel Sq2 is suppressed.

FIG. 6(a) is a perspective view illustrating an example of a shape of a light diffusion particle, and FIG. 6(b) is a perspective plan view illustrating a relationship between a shape of a light-emitting region of the subpixel and the shape of the light diffusion particle.

Figure 6:
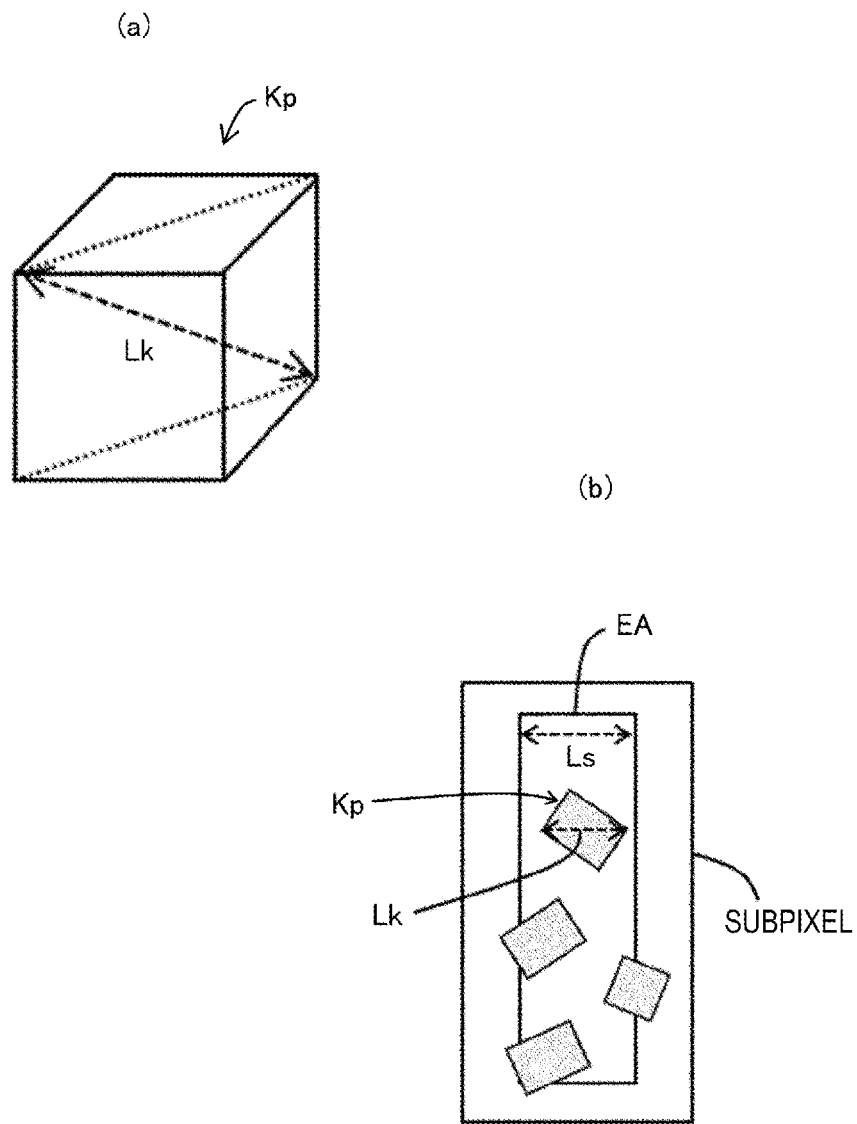
FIG. 6(a) is a perspective view illustrating an example of a shape of a light diffusion particle.
FIG. 6(b) is a perspective plan view illustrating a relationship between a shape of a light-emitting region of the subpixel and the shape of the light diffusion particle.

As illustrated in FIG. 6, a maximum diameter Lk of the light diffusion particle Kp is smaller than a minimum diameter Ls of the light-emitting region EA of each of the subpixels Sp1, Sq1, Sp2, and Sq2. Although the light diffusion particle Kp has a cubic shape in FIG. 6(a), this is merely an example, and the light diffusion particle Kp may have any shape (including a true sphere, an oval sphere, and a polyhedron). The maximum diameter Lk of the light diffusion particle Kp is the maximum length of line segments each connecting two points on the surface of the light diffusion particle Kp, and the minimum diameter Ls of the light-emitting region EA is the minimum length of line segments each connecting two points on the outer edge of the light-emitting region EA. When the maximum diameter Lk varies for each light diffusion particle Kp, the average maximum diameter of a plurality of the light diffusion particles Kp is compared with the minimum diameter Ls of the light-emitting region EA.

In this way, by making the maximum diameter Lk of the light diffusion particle Kp smaller than the minimum diameter Ls of the light-emitting region EA, blur of the image can be suppressed.

Figure 7:
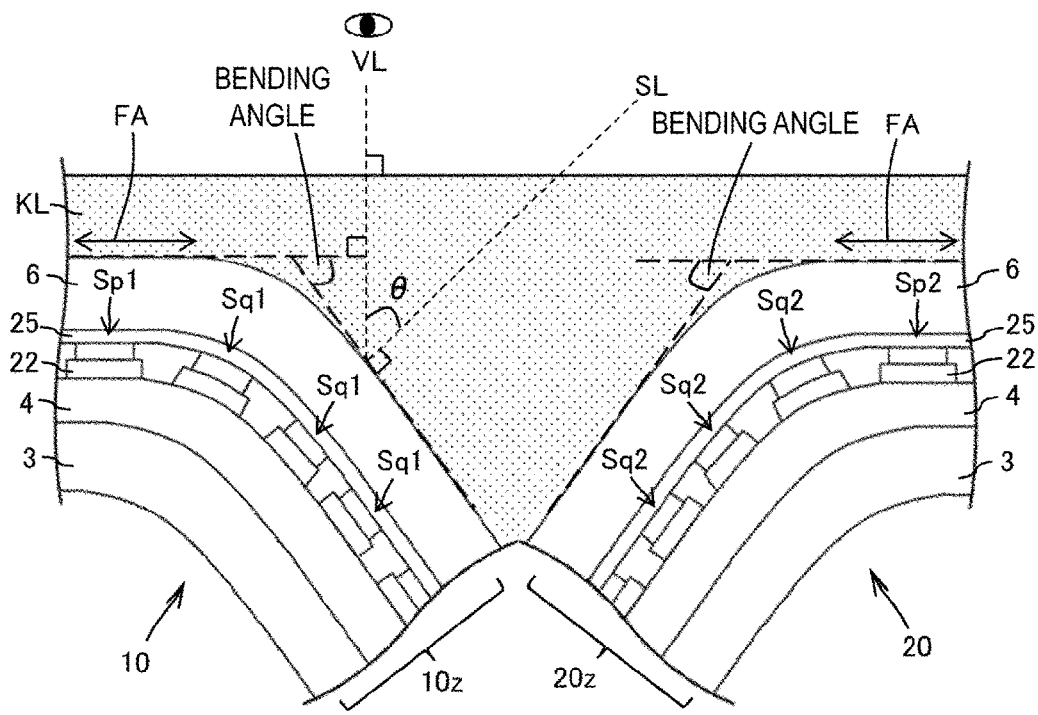
FIG. 7 is a cross-sectional view illustrating another configuration of the display device.

FIG. 7 is a cross-sectional view illustrating another configuration of the display device. As illustrated in FIG. 4, the front luminance ratio of the subpixel decreases as the viewing angle increases. As illustrated in FIG. 7, a viewing angle θ (an angle formed by a perpendicular line VL of a screen and a perpendicular line SL of the first end portion 10z) when the first end portion 10z (including the plurality of subpixels Sq1 arranged in the oblique direction) is viewed from the direction of the perpendicular line VL of the screen is equal to a bending angle of the first end portion 10z with respect to the non-end portion FA. Similarly, a viewing angle when the subpixel Sq2 (including the plurality of subpixels Sq2 arranged in the oblique direction) at the second end portion 20z is viewed from a perpendicular direction of the non-end portion FA is equal to a bending angle of the second end portion 20z with respect to the non-end portion FA.

Thus, in the first display panel 10, the bending angle of the first end portion 10z with respect to the non-end portion FA may be made equal to a viewing angle at which the front luminance ratio is 0.5 or more (θ is 65° or less in FIG. 4), and in the second display panel 20, the bending angle of the second end portion 20z with respect to the non-end portion FA may be made equal to a viewing angle at which the front luminance ratio is 0.5 or more (θ is 65° or less in FIG. 4).

The embodiments described above are for the purpose of illustration and description and are not intended to be limiting. It will be apparent to those skilled in the art that many variations will be possible in accordance with these examples and descriptions.

Supplement

First Aspect

A display device including:
a first display panel including a first end portion that is bent; and
a second display panel including a second end portion that is bent,
wherein the first display panel and the second display panel are arranged in a plane such that the first end portion and the second end portion are adjacent to each other, a subpixel is provided at each of the first end portion and the second end portion, and a connecting portion having a light diffusion function is formed between the first end portion and the second end portion.

Second Aspect

The display device according to, for example, the first aspect,
wherein the display device is provided with
a first period in which an image is displayed on the subpixel at the first end portion and an image is not displayed on the subpixel at the second end portion, and
a second period in which an image is not displayed on the subpixel at the first end portion and an image is displayed on the subpixel at the second end portion.

Third Aspect

The display device according to, for example, the first or second aspect, further including
a light diffusion layer covering the first display panel and the second display panel.

Fourth Aspect

The display device according to, for example, the third aspect,
wherein the light diffusion layer has an adhesive function, and
the connecting portion includes a part of the light diffusion layer.

Fifth Aspect

The display device according to, for example, the second aspect,
wherein in the first display panel, when the same gray scale is input to the subpixel at a non-end portion and the subpixel at the first end portion, luminance of the subpixel at the first end portion is higher than luminance of the subpixel at the non-end portion, and
in the second display panel, when the same gray scale is input to the subpixel at a non-end portion and the subpixel at the second end portion, luminance of the subpixel at the second end portion is higher than luminance of the subpixel at the non-end portion.

Sixth Aspect

The display device according to, for example, the second aspect,
wherein the first period is an odd-numbered frame period, and the second period is an even-numbered frame period.

Seventh Aspect

The display device according to, for example, the third aspect,
wherein the light diffusion layer includes a light diffusion particle and a resin.

Eighth Aspect

The display device according to, for example, any one of the first to seventh aspects,
wherein in the first display panel, a bending angle of the first end portion with respect to a non-end portion is equal to a viewing angle at which a front luminance ratio is 0.5 or more, and in the second display panel, a bending angle of the second end portion with respect to a non-end portion is equal to a viewing angle at which the front luminance ratio is 0.5 or more.

Ninth Aspect

The display device according to, for example, the seventh aspect,
wherein a maximum diameter of the light diffusion particle is smaller than a minimum diameter of a light-emitting region of the subpixel.

Tenth Aspect

The display device according to, for example, any one of the first to ninth aspects,
wherein the subpixel includes a light-emitting element including a first electrode, a light-emitting layer, and a second electrode.

Eleventh Aspect

The display device according to, for example, any one of the first to tenth aspects,
wherein the first display panel and the second display panel have flexibility.

Twelfth Aspect

The display device according to, for example, the tenth aspect,
wherein the light-emitting element is an organic light-emitting diode or a quantum dot light-emitting diode.

The invention claimed is:

1. A display device comprising:
a first display panel including a first end portion, the first end portion being bent; and
a second display panel including a second end portion, the second end portion being bent,
wherein the first display panel and the second display panel are arranged in a plane such that the first end portion and the second end portion are adjacent to each other,
a subpixel is provided at each of the first end portion and the second end portion, and
a connecting portion having a light diffusion function is formed between the first end portion and the second end portion.

2. The display device according to claim 1,
wherein the display device is provided with
a first period in which an image is displayed on the subpixel at the first end portion and an image is not displayed on the subpixel at the second end portion, and
a second period in which an image is not displayed on the subpixel at the first end portion and an image is displayed on the subpixel at the second end portion.

3. The display device according to claim 1, further comprising
a light diffusion layer covering the first display panel and the second display panel.

4. The display device according to claim 3,
wherein the light diffusion layer has an adhesive function, and
the connecting portion includes a part of the light diffusion layer.

5. The display device according to claim 2,
wherein in the first display panel, when the same gray scale is input to the subpixel at a non-end portion and the subpixel at the first end portion, luminance of the subpixel at the first end portion is higher than luminance of the subpixel at the non-end portion, and
in the second display panel, when the same gray scale is input to the subpixel at a non-end portion and the subpixel at the second end portion, luminance of the subpixel at the second end portion is higher than luminance of the subpixel at the non-end portion.

6. The display device according to claim 2,
wherein the first period is an odd-numbered frame period, and the second period is an even-numbered frame period.

7. The display device according to claim 3,
wherein the light diffusion layer includes a light diffusion particle and a resin.

8. The display device according to claim 1,
wherein in the first display panel, a bending angle of the first end portion with respect to a non-end portion is equal to a viewing angle at which a front luminance ratio is 0.5 or more, and in the second display panel, a bending angle of the second end portion with respect to a non-end portion is equal to a viewing angle at which the front luminance ratio is 0.5 or more.

9. The display device according to claim 7,
wherein a maximum diameter of the light diffusion particle is smaller than a minimum diameter of a light-emitting region of the subpixel.

10. The display device according to claim 1,
wherein the subpixel includes a light-emitting element including a first electrode, a light-emitting layer, and a second electrode.

11. The display device according to claim 1,
wherein the first display panel and the second display panel have flexibility.

12. The display device according to claim 10,
wherein the light-emitting element is an organic light-emitting diode or a quantum dot light-emitting diode.

* * * * *